United States Patent
Hoebel et al.

(10) Patent No.: US 9,764,423 B2
(45) Date of Patent: Sep. 19, 2017

(54) METHOD FOR MANUFACTURING A HYBRID COMPONENT

(71) Applicant: ALSTOM Technology Ltd, Baden (CH)

(72) Inventors: Matthias Hoebel, Windisch (CH); Thomas Etter, Muhen (CH); Maxim Konter, Klingnau (CH); Julius Schurb, Zürich (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 490 days.

(21) Appl. No.: 14/192,967

(22) Filed: Feb. 28, 2014

(65) Prior Publication Data
US 2014/0242400 A1    Aug. 28, 2014

(30) Foreign Application Priority Data
Feb. 28, 2013   (EP) .................................. 13157266

(51) Int. Cl.
*B22F 3/105*     (2006.01)
*B23K 26/00*     (2014.01)
(Continued)

(52) U.S. Cl.
CPC ........ *B23K 26/0093* (2013.01); *B22F 3/1055* (2013.01); *B22F 5/009* (2013.01);
(Continued)

(58) Field of Classification Search
CPC ....... B22F 7/04; B22F 3/1055; B23K 26/0093
See application file for complete search history.

(56) References Cited

U.S. PATENT DOCUMENTS

| 5,155,324 A | 10/1992 | Deckard et al. |
| 2005/0242473 A1 | 11/2005 | Newell et al. |

(Continued)

FOREIGN PATENT DOCUMENTS

| CN | 101670432 A | 3/2010 |
| CN | 102369073 A | 3/2012 |

(Continued)

OTHER PUBLICATIONS

Gibson, et al., Additive Manufacturing Technologies, Springer, 2010.*

(Continued)

*Primary Examiner* — Jonathan Johnson
*Assistant Examiner* — Christopher Kessler
(74) *Attorney, Agent, or Firm* — Buchanan Ingersoll & Rooney PC

(57) ABSTRACT

The invention refers to a method for manufacturing a hybrid component including the following steps of manufacturing a preform as a first part of the hybrid component, then successively building up on that preform a second part of the component from a metallic powder material by means of an additive manufacturing process by scanning with an energy beam, thereby establishing a controlled grain orientation in primary and in secondary direction of at least a part of the second part of the component. The controlled secondary grain orientation is realized by applying a specific scanning pattern of the energy beam, which is aligned to the cross section profile of the component or to the local load conditions for the component.

13 Claims, 9 Drawing Sheets

(51) Int. Cl.
  *B22F 5/00*   (2006.01)
  *B22F 7/06*   (2006.01)
  B23P 6/00   (2006.01)
  B23P 15/04  (2006.01)
  B29C 67/00  (2017.01)

(52) U.S. Cl.
  CPC ............... *B22F 7/06* (2013.01); *B23P 6/007* (2013.01); *B23P 15/04* (2013.01); *B29C 67/0088* (2013.01); *Y02P 10/295* (2015.11); *Y10T 428/31678* (2015.04)

(56) References Cited

U.S. PATENT DOCUMENTS

| | | | |
|---|---|---|---|
| 2011/0135952 A1 | 6/2011 | Morris et al. | |
| 2012/0222306 A1* | 9/2012 | Mittendorf | F01D 5/005 29/889.1 |
| 2013/0263977 A1* | 10/2013 | Rickenbacher | B05D 3/06 148/540 |

FOREIGN PATENT DOCUMENTS

| | | |
|---|---|---|
| GB | 2 378 150 | 2/2003 |
| JP | S60-82648 | 5/1985 |
| JP | S63-125649 | 5/1988 |
| JP | 2000-104101 | 4/2000 |
| JP | 9001-504549 | 4/2001 |
| JP | 2001-277368 | 10/2001 |
| JP | 2003-129862 | 5/2003 |
| JP | 2003-518193 | 6/2003 |
| JP | 2004-122489 A | 4/2004 |
| JP | 2005-537134 | 12/2005 |
| JP | 2006-255767 | 9/2006 |
| JP | 2006-312782 | 11/2006 |
| JP | 2008-081840 | 4/2008 |
| JP | 2010-203258 | 9/2010 |
| JP | 2011-052686 | 3/2011 |
| JP | 2011-064077 | 3/2011 |
| JP | 2012-000620 | 1/2012 |
| JP | 2014-129597 | 7/2014 |
| KR | 102006-0028453 | 3/2006 |
| RU | 2212982 C2 | 9/2003 |
| WO | 2008/116518 | 10/2008 |

OTHER PUBLICATIONS

Canadian Office Action for Canadian Patent Application No. 2,843,450 dated Dec. 1, 2016.
Office Action issued by the U.S. Patent and Trademark Office on Nov. 2, 2016, in U.S. Appl. No. 14/192,967. (22 pages).

* cited by examiner

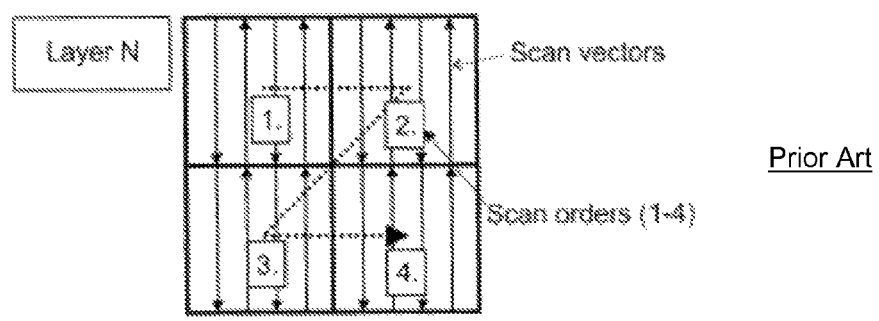
Fig. 2a — Prior Art
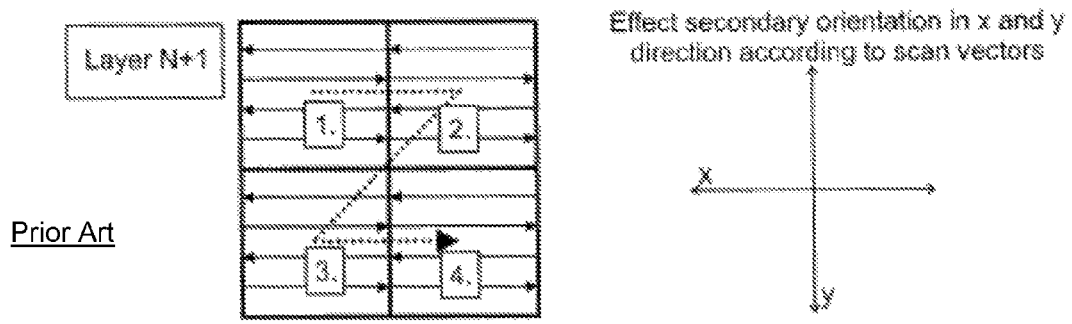
Fig. 2b — Prior Art

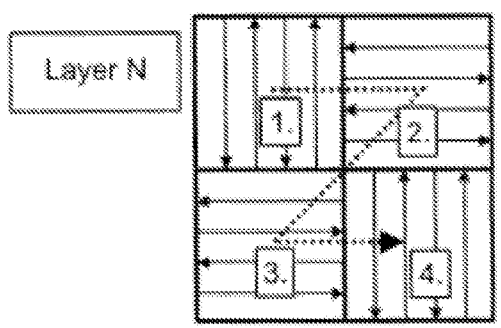
Fig. 3a
Prior Art
Effect secondary orientation in x and y direction according to scan vectors
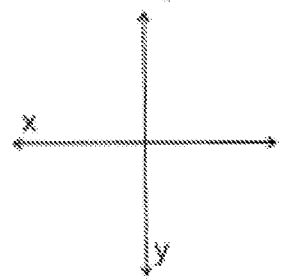
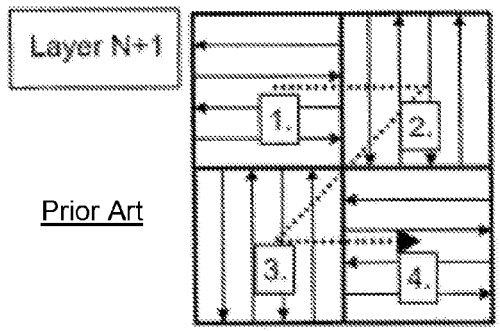
Prior Art
Fig. 3b Prior Art

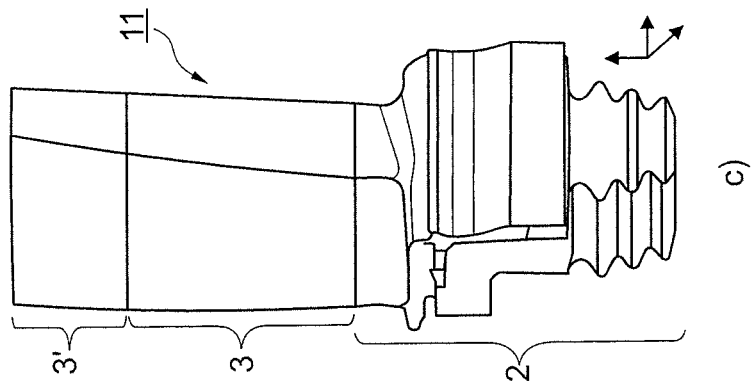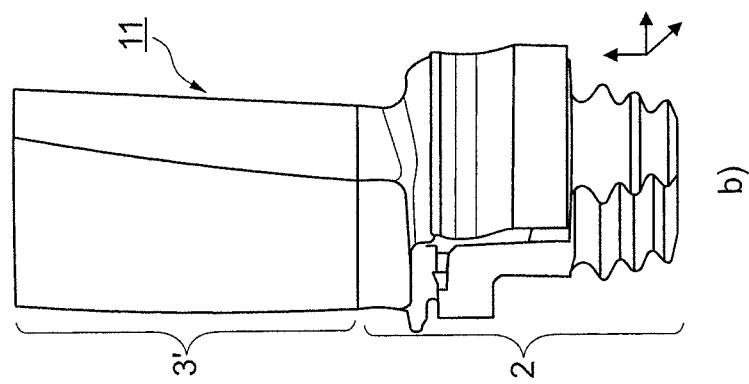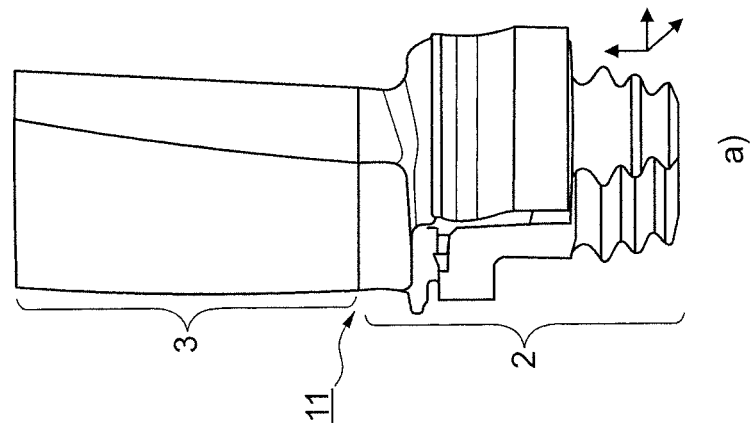
Fig. 7

METHOD FOR MANUFACTURING A HYBRID COMPONENT

CROSS-REFERENCE TO RELATED APPLICATIONS

This application claims priority to European application 13157266.1 filed Feb. 28, 2013, the contents of which are hereby incorporated in its entirety.

TECHNICAL FIELD

The present invention relates to the technology of high-temperature resistant components, especially hot gas path components for gas turbines. It refers to a method for manufacturing a hybrid component, preferably a metallic hybrid component, by a combination of laser additive manufacturing, such as selective laser melting (SLM), selective laser sintering (SLS) or electron beam melting (EBM) with conventional manufacturing technologies.

BACKGROUND

Additive manufacturing has become a more and more attractive solution for the manufacturing of metallic functional prototypes and components. It is known that SLM, SLS and EBM methods use powder material as base material. The component or article is generated directly from a powder bed. Other additive manufacturing methods, such as laser metal forming (LMF), laser engineered net shape (LENS) or direct metal deposition (DMD) locally fuse material onto an existing part. This newly generated material may be deposited either as wire or as powder, where the powder deposition device is moved along a predefined path with either a robot or a CNC machine. Build on machined preforms with SLM is known prior art for die-casting, where stainless steel or other known die-cast alloys are used.

FIG. 1 shows a basic SLM arrangement 10, known from the prior art, wherein a three-dimensional article (component) 11 is manufactured by successive addition of powder layers 12 of a predetermined layer thickness d, area and contour, which are then melted by means of a scanned laser beam 14 from a laser device 13 and controlled by a control unit 15.

Usually, the scan vectors of one layer are parallel to each other within that layer (see FIG. 2a) or defined areas (so called chest board patterns) have a fixed angle between the scan vectors in one layer (see FIG. 3a). Between subsequent layers (that means between layer n and layer n+1; and between layer n+1 and layer n+2 and so on) the scan vectors are either rotated by an angle of for example 90° (see FIG. 2b, 3b) or by an angle different of 90° or n*90°, (see FIG. 4a, 4b). This (using alternating scanner paths for subsequent layers or for certain areas of a pattern, e.g. chest board, within one layer of the article) was done so far to achieve a good quality (optimum part/article density and geometrical accuracy) with respect to an article made by SLM.

A typical SLM track alignment known from the state of the art is shown in FIG. 5.

Due to the typical temperature profile in the melt pool and the resulting thermal gradients in the vicinity of the melt pool, a faster and preferred grain growth perpendicular to the powder plane (x-y plane) is favoured. This results in a characteristic microstructure showing elongated grains in the z-direction (=primary grain orientation direction, crystallographic [001] direction). This direction is perpendicular to the x-y plane. Therefore, a first specimen extending in z-direction (see FIG. 1) shows properties different from a second specimen extending in the x-y plane (=secondary grain orientation direction, secondary crystallographic direction), for example the Young's modulus along the z-direction is generally different than the Young's modulus in the powder plane (x-y plane).

Therefore, one characteristic feature of powder-based or other additive manufacturing technology is the strong anisotropy of material properties (for example Young's modulus, yield strength, tensile strength, low cycle fatigue behaviour, creep) resulting from the known layer-wise build-up process and the local solidification conditions during the SLM powder bed processing.

Such anisotropy of material properties could be a disadvantage in several applications. Therefore, the applicant has already filed two so far unpublished patent applications, which disclose that the anisotropic material behaviour of components manufactured by additive laser manufacturing techniques can be reduced by an appropriate "post-built" heat treatment, resulting in more isotropic material properties.

During the last 3 decades directionally solidified (DS) and single-crystal (SX) turbine components were developed, which are produced by investment casting and where low values of for example the Young's modulus in primary and secondary grain orientation (normal to the primary growth direction) are aligned with thermo-mechanical load conditions. Such an alignment is here provided by application of seed crystals and grain selectors and has resulted in a significant increase of the components performance and lifetime.

However, so far such techniques to control the primary as well as the secondary crystallographic orientation were not known for parts/components produced by SLM.

It has also become possible to control the microstructure of deposits formed on single-crystal (SX) substrates with generative laser processes, a technique called epitaxial laser metal forming (E-LMF). These methods can produce parts, which have either a preferred grain orientation (DS—directionally solidified) or an absence of grain boundaries (SX—single crystal).

With increasing design complexity of future hot gas path components, the economic manufacturing of such SX or DS parts/components by casting will become more and more problematic, as the casting yield for thin- or double walled components is expected to drop. Moreover, epitaxial laser metal forming can be only applied to parts, where the base material has already a single crystal orientation.

The SLM technique is able to manufacture high performance and complex shaped parts due to its capability to generate very sophisticated designs directly from a powder bed.

A similar control of the microstructure as described above for cast SX or DS components would be thus highly beneficial for parts and prototypes which are manufactured with the SLM technique or other additive manufacturing laser techniques. An additional control and alignment of the Young's modulus would further increase the performance and application potential of such components.

Therefore the applicant has already filed a so far unpublished patent application, which discloses a method for manufacturing a metallic component/a three-dimensional article by additive manufacturing, preferably by Selective Laser Melting (SLM), with improved properties of the component, where the anisotropic properties of the component could either be used in a favourable manner, or where anisotropy could be reduced or avoided, depending on the design intent for the component. Furthermore, an appropriate method was described for realizing an alignment of the anisotropic properties of the article with the local thermo-mechanical load conditions. A controlled secondary grain orientation is realized by applying a specific scanning pattern of the energy beam.

Unfortunately, additive manufacturing, for example SLM, has a low build rate as a disadvantage. This is an obstacle for its commercial success because of the long process times with associated high manufacturing costs and low to moderate throughput for serial production.

SUMMARY

It is an object of the present invention to overcome the above-described disadvantages. Therefore, a method for manufacturing a hybrid component with optimized properties should be developed which has an increased productivity of the process and reduced costs per component compared to the known methods. The manufactured component should have an extended service lifetime with respect to the service lifetime of known prior art components.

This and other objects are obtained by a method according to claim 1.

The disclosed method for manufacturing a hybrid component mainly made of a Ni—, Co—or Fe— based super alloy by powder based additive manufacturing methods starts from preforms which are obtained by manufacturing methods, such as casting, forging or milling, or by sintering or by a separate additive manufacturing process. The manufactured hybrid component according to the invention has improved properties.

The method comprising the steps of
a) manufacturing a preform as a first part of the hybrid component, then
b) successively building up on that preform a second part of the component from a metallic base material by means of an additive manufacturing process by scanning with an energy beam, thereby
c) establishing a controlled grain orientation in primary and in secondary direction of at least a part of the second part of the component,
d) wherein the controlled secondary grain orientation is realized by applying a specific scanning pattern of the energy beam, which is aligned to the cross section profile of said component or to the local load conditions for said component.

The additive manufacturing technologies for the second part of the component are selective laser melting (SLM), selective laser sintering (SLS), electron beam melting (EBM), laser metal forming (LMF) laser engineered net shape (LENS), direct metal deposition (DMD) or suchlike processes.

The preform can be preferred manufactured by casting, forging, milling, or by sintering or by generative processes such as SLM, EBM, LMF, or by wire EDM or by a combination of two or more of these methods. In a preferred embodiment the preform is a SX— or a DS-preform.

The component/article manufactured according to the present invention has a controlled secondary crystallographic grain orientation, which leads to a higher lifetime and operation performance of metallic parts and prototypes in comparison with components manufactured according to the state of the art additive manufacturing methods.

In a preferred embodiment of the method the active control of the secondary grain orientation is achieved by placing the scanner paths alternately parallel (in the first layer) and orthogonal (in the next layer) and so on to the direction of the component, where a smallest value of the Young's modulus is desired. Normally the direction of minimum Young's modulus should be the direction, where the highest thermo mechanical load is applied.

In another embodiment the control of the secondary grain orientation is achieved by a change of the scanner paths direction in subsequent layers, which does not deviate by more than 15° from n*90°, n being an integer value.

Furthermore, according to another embodiment of the method the preferential alignment of the secondary grain orientation is applied only in designated sub-volumes.

In order to achieve a non-pronounced secondary grain orientation the scanner paths are rotated by random angles in subsequent layers, e.g. the scan vectors are parallel within each island of each layer and rotated by 63° in each subsequent layer.

The method can be used especially for manufacturing hot gas parts and prototypes with complex design. Such parts can be found, for example in the first turbine stages of a gas turbine, in a compressor or in combustors. It is an advantage that the method can be used both for new part manufacturing as well as within a reconditioning/repair process.

According to a preferred embodiment of the invention said additive manufacturing process for the second part of the component is one of selective laser melting (SLM), selective laser sintering (SLS) or electron beam melting (EBM), and the method comprises the steps of:
a) manufacturing or at least pre-machining a preform;
b) generating a three-dimensional model of the volumes to be added on the preform followed by a slicing process to calculate the cross sections;
c) passing said calculated cross sections to a machine control unit afterwards;
d) providing a metallic powder material, which is needed for the process;
e) placing the preform in a work chamber such that the interface to the zone to be additively manufactured is parallel to the machine's powder deposition plane;
f) determining the exact positions and orientation of the preform;
g) preparing a powder layer with a regular and uniform thickness on the preform;
h) performing melting by scanning with an energy beam an area corresponding to a cross section of said component according to the three-dimensional model stored in the control unit, wherein the energy beam is scanned in a way that the secondary crystallographic grain orientation matches with the design intent of the component or with the known main crystallographic directions of the preform;
i) lowering the upper surface of the previously formed cross section by one layer thickness;
j) repeating said steps from g) to i) until reaching the last cross section according to the three-dimensional model; and
k) optionally heat treating said component.

In an embodiment of the invention in step a) an existing preform is cut and/or machined along a preferred plane and the following steps b) to k) for SLM build-up of the component are done on this pre-machined preform.

The energy beam, for example high density energy laser beam, is scanned with such a specific scanning pattern that the secondary crystallographic grain orientation matches with the design intent of the component.

More specifically, the particle size distribution of said powder is adjusted to the layer thickness of said powder layer in order to establish a good flowability, which is required for preparing powder layers with regular and uniform thickness.

According to a further embodiment of the invention the powder particles have a spherical shape.

According to just another embodiment of the invention an exact particle size distribution of the powder is obtained by sieving and/or winnowing (air separation).

According to another embodiment of the invention said powder is provided by means of a powder metallurgical process, specifically one of gas or water atomization, plasma-rotating-electrode process or mechanical milling.

According to another embodiment of the invention said metallic powder material is a high-temperature Ni- or Co- or Fe-based alloy or combinations thereof.

Specifically, said alloy can contain finely dispersed oxides, specifically one of $Y_2O_3$, $Al_2O_3$, $ThO_2$, $HfO_2$, $ZrO_2$.

An important aspect of the present invention is the fact that the preferred microstructures do not have to be implemented in the whole volume of the part. Instead, the alignment can be turned on and off in an arbitrary manner for different zones, depending on the local mechanical integrity (MI) requirements. This is an advantage compared to investment casting or E(epitaxial)-LMF, where the control of the microstructure is lost, once epitaxial growth conditions are no longer present and equiaxed grain growth has occurred.

BRIEF DESCRIPTION OF THE DRAWINGS

The present invention is now to be explained more closely by means of different embodiments and with reference to the attached drawings.

FIG. 2a, 2b show a first scanning strategy (with alternating scan vectors with 90° angle between adjacent layers) for SLM manufacturing;

FIG. 3a, 3b show a second scanning strategy (chest board strategy) for SLM manufacturing;

FIGS. 7a to 7c show different configurations of SLM build-up on SX preforms according to embodiments of the present invention;

DETAILED DESCRIPTION

As described above in the prior art, one characteristic feature of powder-based additive manufacturing technology is the strong anisotropy of material properties resulting from the layer-wise build-up process.

Figure 6:
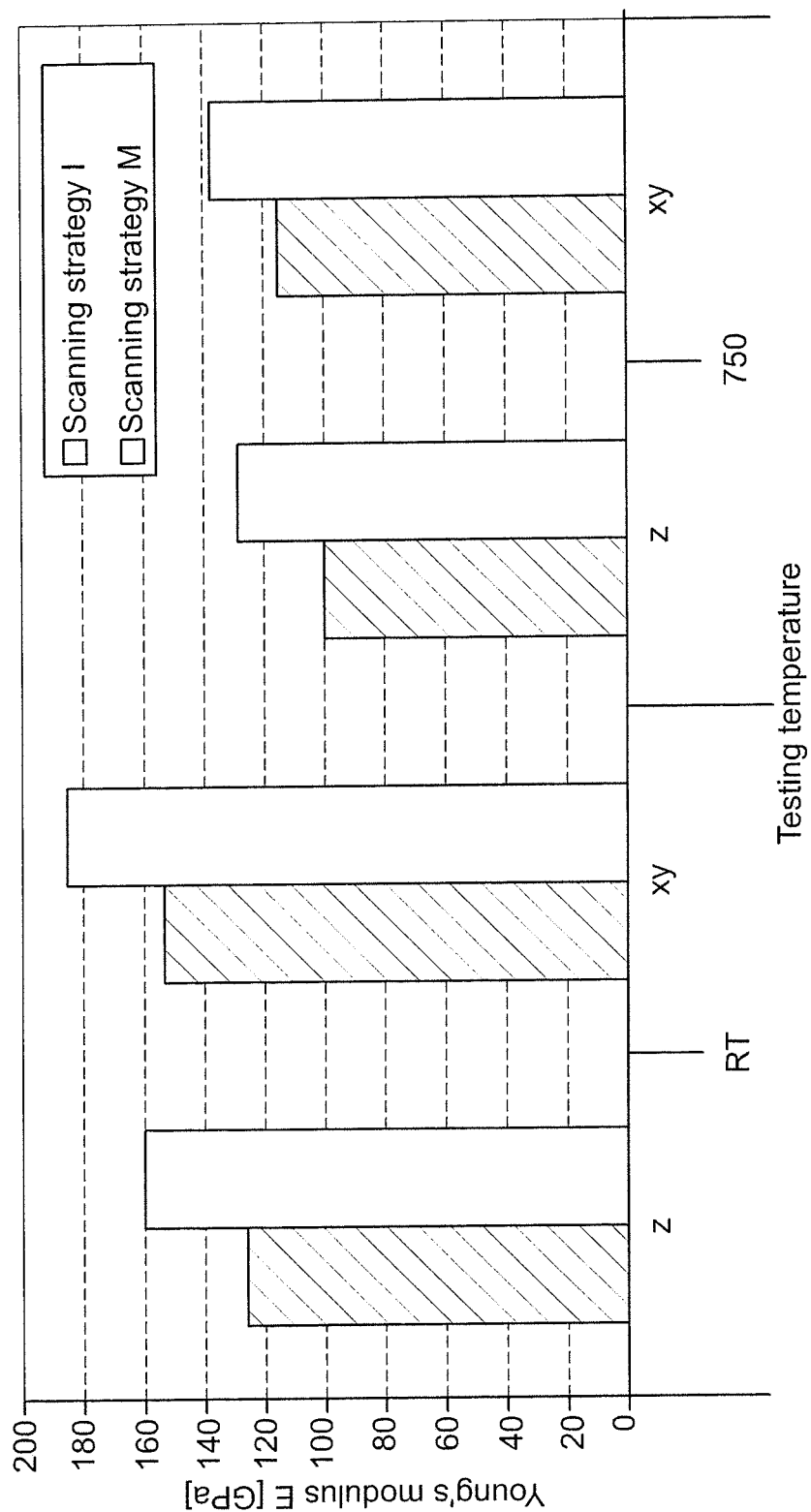
FIG. 6 shows values of Young's modulus at Room Temperature and at 750° C. as testing temperature for two different scanning strategies for specimen made of Hastelloy® X measured in the "as built" condition.

It has turned out that the mechanical properties along the z-direction are different to ones in the x-y plane, which is the powder plane. The Young's modulus along the z-direction (built direction) is generally lower than the Young's modulus in the x-y plane. This is shown in FIG. 6 for specimens made of Hastalloy® X by additive manufacturing with two different scanning strategies, that means two different scanning patterns, and which were tested at room temperature RT and at a temperature of 750° C. The Young's modulus was measured in the "as built" condition. Due to powder-based article production and the inherent high cooling rates of the energy beam-material interaction in these processes, the material is very homogeneous with respect to chemical composition and principally free of segregations. In addition, the material in the "as built" condition has a very fine microstructure (e.g. precipitates and grain size), much finer compared to conventionally cast or wrought super alloys. With scanning strategy I always a significantly lower Young's modulus was achieved in comparison to the different scanning strategy M. This is true for both of the primary (z-direction) and the secondary orientation (x-y plane) and also for two different testing temperatures (Room Temperature RT and 750° C.).

The observation about columnar grain growth in the [001] direction is well known. However, a similar directional dependency also exists in the x-y plane. It was found, that with certain process set-ups it is possible to control [001] growth within the secondary plane (scanner movement plane).

The basic idea of selective laser melting process/additive manufacturing process with controlled primary and secondary grain orientation has already been disclosed in a separate so far not published application of the applicant.

The core of the present application is to achieve a similar control also for hybrid assemblies/components, where the additive manufacturing of the second part of the component starts from a machined/manufactured preform as the first part of the component.

The method for manufacturing a hybrid component 11 according to the invention comprising the steps of a) manufacturing a preform 2 as a first part of the hybrid component 11, then
b) successively building up on that preform 2 a second part of the component 11 from a metallic powder material 12 by means of an additive manufacturing process by scanning with an energy beam 14, thereby
c) establishing a controlled grain orientation in primary and in secondary direction of at least a part of the second part of the component 11,
d) wherein the controlled secondary grain orientation is realized by applying a specific scanning pattern of the energy beam 14, which is aligned to the cross section profile of said component 11 or to the local load conditions for said component 11.

It is essentially for the present invention that the secondary grain orientation is aligned with the characteristic load conditions of the component, e.g. follows the component cross-section profile.

In one embodiment of the disclosed method the active control of the secondary grain orientation is achieved by placing the scanner paths alternately parallel (in the first layer) and orthogonal (in the next layer) and so on in the following layers to the direction of the component, where a smallest value of the Young's modulus is desired.

The control of the secondary grain orientation can also be achieved by a change of the scanner paths direction in subsequent layers, which does not deviate by more than 15° from n*90°, n being an integer value.

The preferential alignment of the secondary grain orientation could be applied only in designated sub-volumes.

The preform 2 can be manufactured by machining (for example by casting, forging or milling), or by sintering or by generative processes such as SLM, EBM, LMF or by wire EDM. It can be made for example of metallic materials or of ceramic materials. The preform 2 can also be manufactured by a combination of two or more of these methods.

The hybrid component 11 can be a complete metallic hybrid component with a metallic first part (preform 2) and a metallic second part or the component 11 is only partly made of metallic material, for example there is a ceramic preform 2 as the first part and a metallic second part of the component 11.

Said additive manufacturing technology for the second part of the component is especially selective laser melting (SLM), selective laser sintering (SLS), and electron beam melting (EBM). Said powder-based additive manufacturing technology may be used to build up an article, such as a blade or vane of a gas turbine, entirely or partly, e.g. blade crown build up on the preforms.

When selective laser melting SLM, selective laser sintering SLS or electron beam melting EBM is used as the additive manufacturing technology for the second part of the component the method according to the invention comprises the following steps:
a) manufacturing or at least pre-machining a preform 2;
b) generating a three-dimensional model of the volumes to be added on the preform 2 followed by a slicing process to calculate the cross sections;
c) passing said calculated cross sections to a machine control unit 15 afterwards;
d) providing a metallic powder material, which is needed for the process;
e) placing the preform 2 in a work chamber such that the interface to the zone to be additively manufactured is parallel to the machine's powder deposition plane;
f) determine the exact positions and orientation of the preform 2;
g) preparing a powder layer 12 with a regular and uniform thickness on the preform 2;
h) performing melting by scanning with an energy beam 14 an area corresponding to a cross section of said component according to the three-dimensional model stored in the control unit 15, wherein the energy beam 14 is scanned in a way that the secondary crystallographic grain orientation matches with the design intent of the component 11 or with the known main crystallographic directions of the preform 2;
i) lowering the upper surface of the previously formed cross section by one layer thickness d;
j) repeating said steps from g) to i) until reaching the last cross section according to the three-dimensional model; and
k) optionally heat treating said component 11.

In one embodiment an existing preform 2 is cut and/or machined along a preferred plane and the following steps for build-up the second part of the component 11 are done on this pre-machined preform 2.

The used powder material for the additive manufacturing process does not necessarily be of the same type as base material (of the preform). For example In738LC powder could be used to generate a new section of a preform made of a different Ni based superalloy, for example MK4.

FIG. 7a, b, c illustrate the different configurations using the example of a hybrid metallic turbine blade assembly, where the material is deposited on a machined fir tree section. In general, the method will be found particularly useful for highly loaded static or rotating turbine parts, such as blades or vanes, although an application for hybrid heat shield assemblies can also be envisaged.

If the method is applied on a conventionally cast preform, the SLM process aligns the laser tracks such that the directions with minimum values of the Young's modulus are aligned with the highest thermo-mechanical load of the part.

If the method is applied on a single crystal preform, an optimum match of the thermo-physical properties is achieved by aligning the scanner paths with the known primary and secondary orientations of the substrate (see FIG. 7a). If the latter are not known, they can be determined either by local polishing or etching or alternatively, by X-ray diffraction techniques.

As an example, the preform 2 may consist of the relatively massive fir tree section of the blade, which has a simple design and can be cast without problems (see FIG. 7). The preform 2 is here a SX preform. Usually, not only the primary, but also the secondary crystallographic directions are controlled in the SX casting process. For better illustration, these directions are also shown in FIG. 7.

One or multiple preforms 2 are then placed in the SLM work chamber and their exact position is determined either by 3D object recognition or by a manual alignment procedure using burn-in marks, laser pointers, in-line cameras or a combination of such tools and techniques. The scanner vectors are then aligned with the secondary crystallographic directions and rotated by 90° (or a multiple of 90°) in subsequent layers. The component 11 according to FIG. 7a shows schematically such a matched orientation between the SX preform 2 and the SLM build up with aligned scanner path 3.

If the anisotropy of the mechanical properties in the in-plane direction is no longer needed or desired, it is possible to revert to isotropic mechanical properties in the powder deposition plane normal to the build direction. This is done by simply choosing arbitrary (random) rotation angles for the scanner pattern in subsequent layers (see for example FIG. 7b, c). FIG. 7b illustrates the SLM build-up with non-aligned scanner path 3' with respect to the SX-preform 2 and FIG. 7c shows a component 11 (turbine blade) with SLM build-up with step change between matched and non-matched secondary orientations between the SX preform 2 and the parts 3, 3.'

The present invention can be applied for many different kinds of metallic materials, however, the main scope of application is related to Ni/Co/Fe based super alloys.

One of the targeted applications are hybrid assemblies, where the preform 2 has SX microstructure. Using the inventive method, such hybrid metallic components with optimised mechanical properties in the most heavily loaded areas can be produced at competitive costs. Not only a primary, but also the secondary crystallographic orientation of the grains is favourably matched with the design intent of the component and/or the main crystallographic axis of the preform 2, resulting in extended service lifetime.

Another important aspect of the present invention is that the preferred microstructure does not have to be implemented in the whole volume of the part, which is generated by SLM. Instead, the alignment can be turned on and off in an arbitrary manner for different zones, depending on the local mechanical integrity (MI) requirements or needs of the component. This is an advantage compared to investment casting or E-LMF, where the control of the microstructure is lost, once epitaxial growth conditions are no longer present and equiaxed grain growth has occurred.

Figure 8:
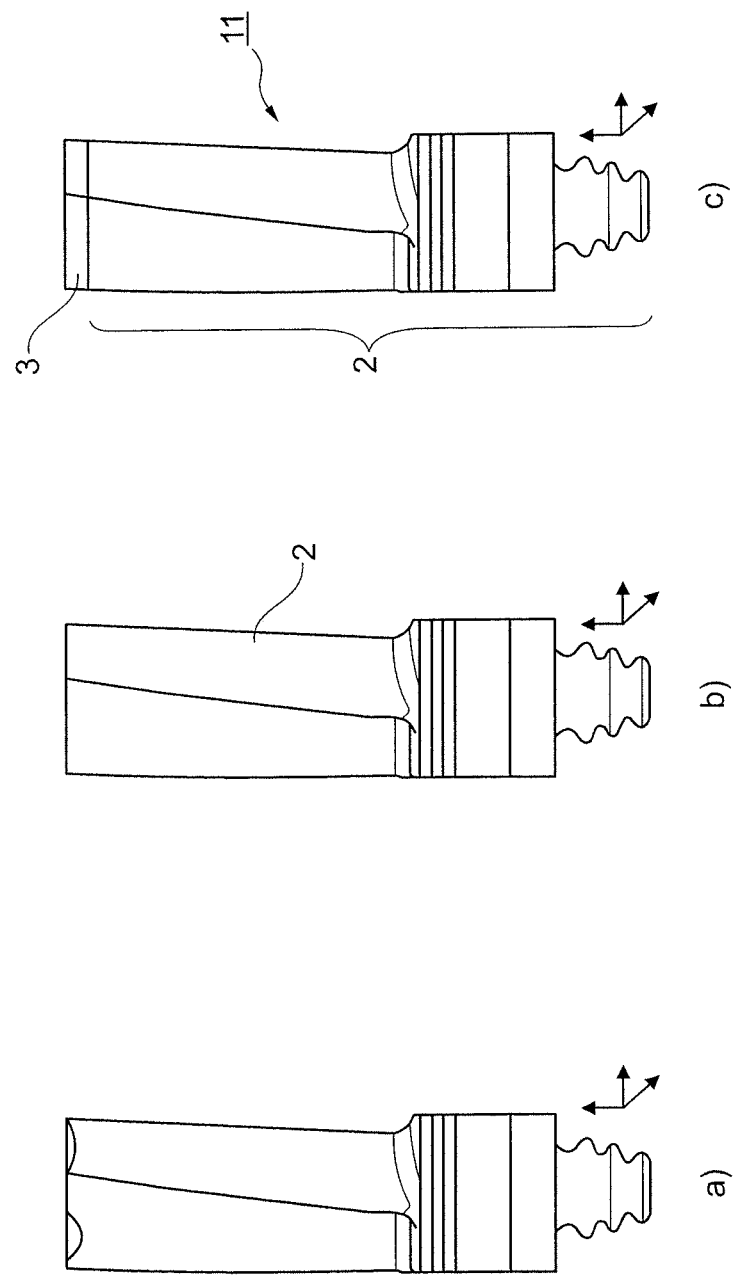
FIGS. 8a to 8c show three main stages of manufacturing a turbine blade in reconditioning and FIG. 9 shows a tip rebuild by SLM on a preform with matched secondary grain orientation.
Figure 9:
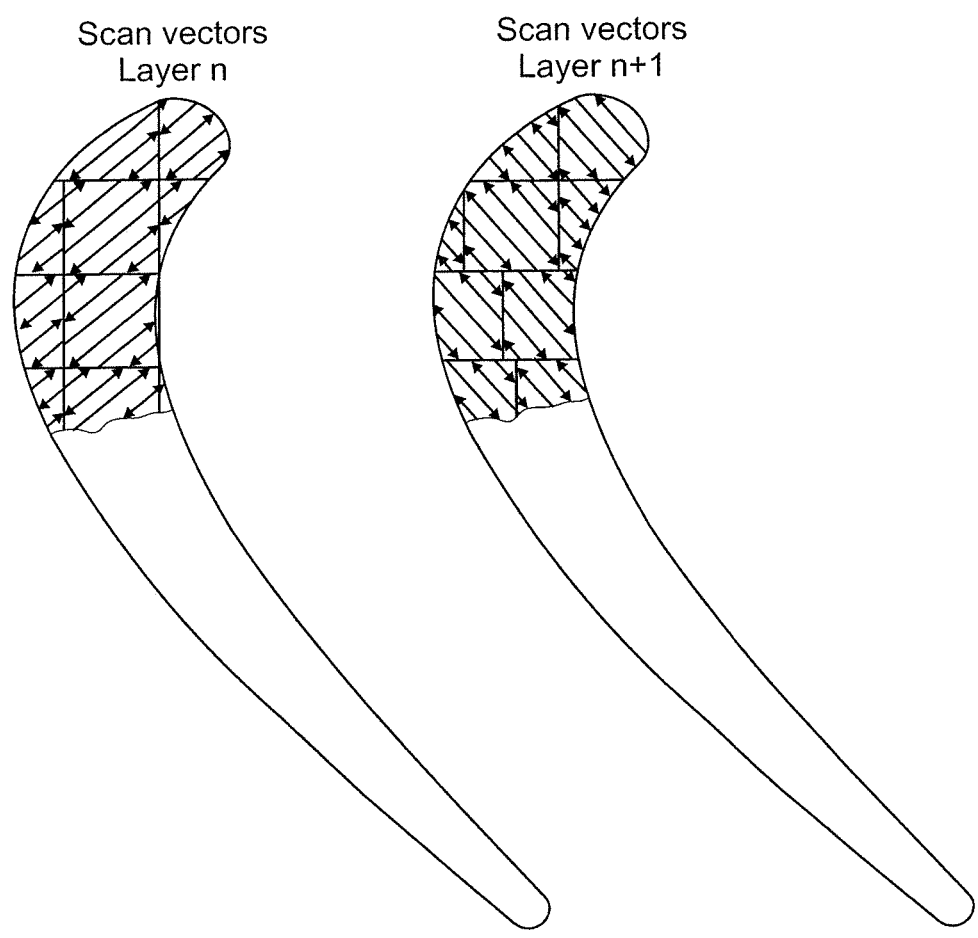

It is also important to note that the method cannot only be applied for the manufacture of new hybrid metallic assemblies. Instead it can be used as well for the reconditioning of hot gas path components, where the heavily damaged or worn areas are replaced with material direct built on a preform 2, which is obtained from the machining of the original ex-service component. Such a scenario is illustrated in FIGS. 8 and 9.

FIG. 8a, b and c show three main stages of manufacturing a turbine blade in reconditioning. In FIG. 8a an ex-service SX blade with heavily damaged tip region is to be seen, FIG. 8b shows the SX blade with damaged tip region removed—the resulting blade body is now the preform 2 according to the invention. FIG. 8c shows the hybrid component 11 with the tip rebuild by SLM with matched grain orientation. This could also be seen in FIG. 9 in which schematically the scan vectors for adjacent layers n resp. n+1 are shown. In this example there is an angle of 90° between the scan vectors of subsequent layers.

The preform 2 according to the invention can either not have been exposed to operating conditions of the turbomachine prior to the additive material build up or the preform 2 can have been obtained from the machining of an ex-service turbine component.

The newly added material can either reproduce the original design of the ex-service component or the newly added material can build up an assembly of different design than the original ex-service component.

The programming of the scanner movements for the selective melting of powder is done in a way that it balances the heat input into the powder bed and results in thermal condition favouring the desired control of primary and secondary grain orientations.

Preferably, a process monitoring system (thermal camera or pyrometer) is used to ensure a temperature distribution at the surface of the powder bed favouring the desired control of primary and secondary grain orientations.

It is essential that not only a primary, but also the secondary crystallographic orientation of the grains is favourably matched with the design intent of the component, resulting in extended service lifetime.

The active control of the secondary grain orientation is achieved by placing the scanner paths parallel and orthogonal to the direction of the component, where a smallest value of the Young's modulus is desired. The angular change of the scanner path direction in the different layers must be 90° or a multiple of this value (see FIG. 2a, 2b). A change of the scanner paths direction in subsequent layers, which does not deviate by more than 15° from n*90°, n being an integer value, is also applicable.

Figure 1:
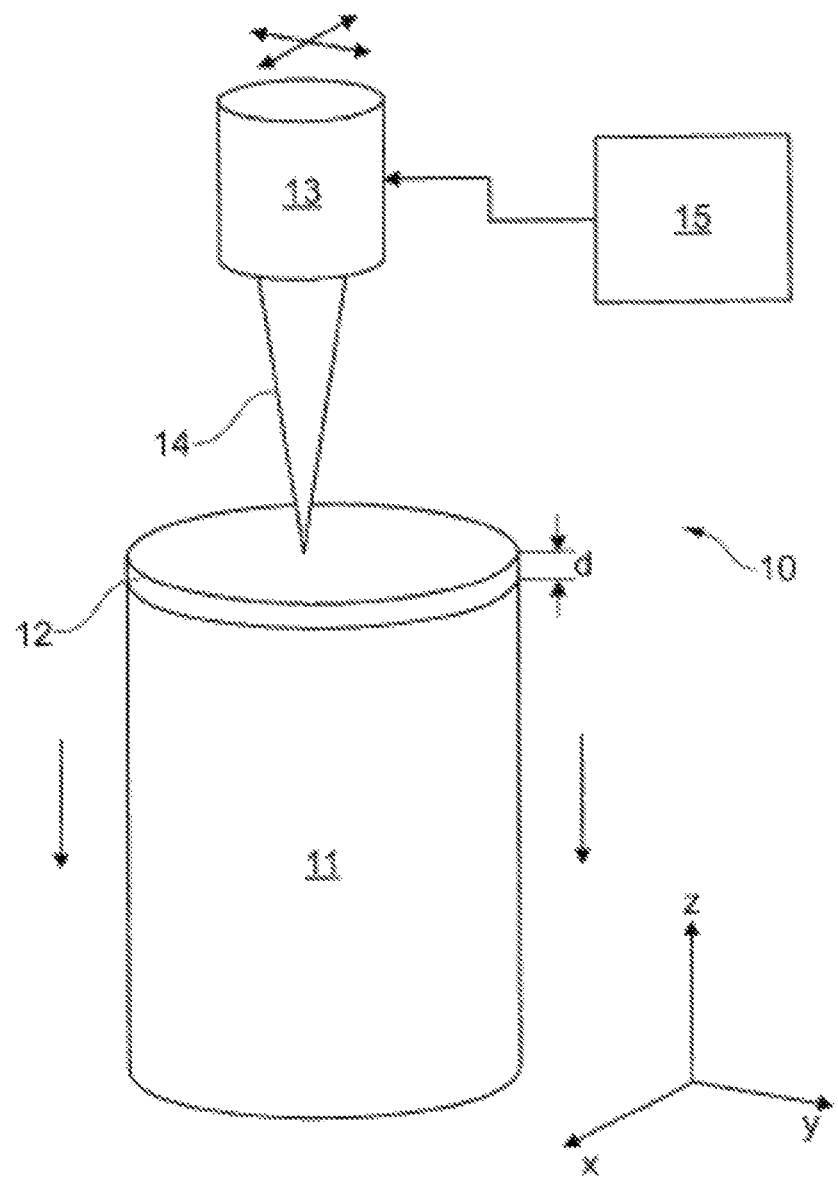
FIG. 1 shows a basic arrangement for SLM manufacturing according to the state of the art, which may be used in the present invention.
Figure 4A:
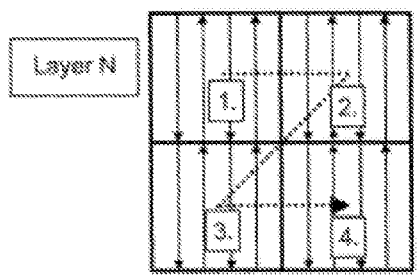
FIGS. 4a to 4d show two additional scanning strategies (with alternating scan vectors with 63° angle between adjacent layers or with random angles) for SLM manufacturing.
Figure 4C:
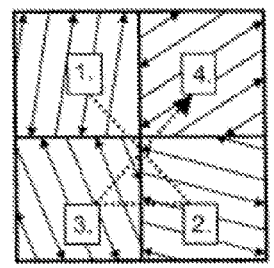
Figure 4B:
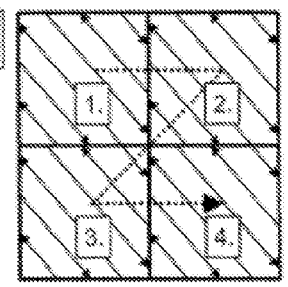
Figure 4D:
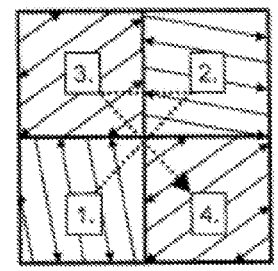
Figure 5:
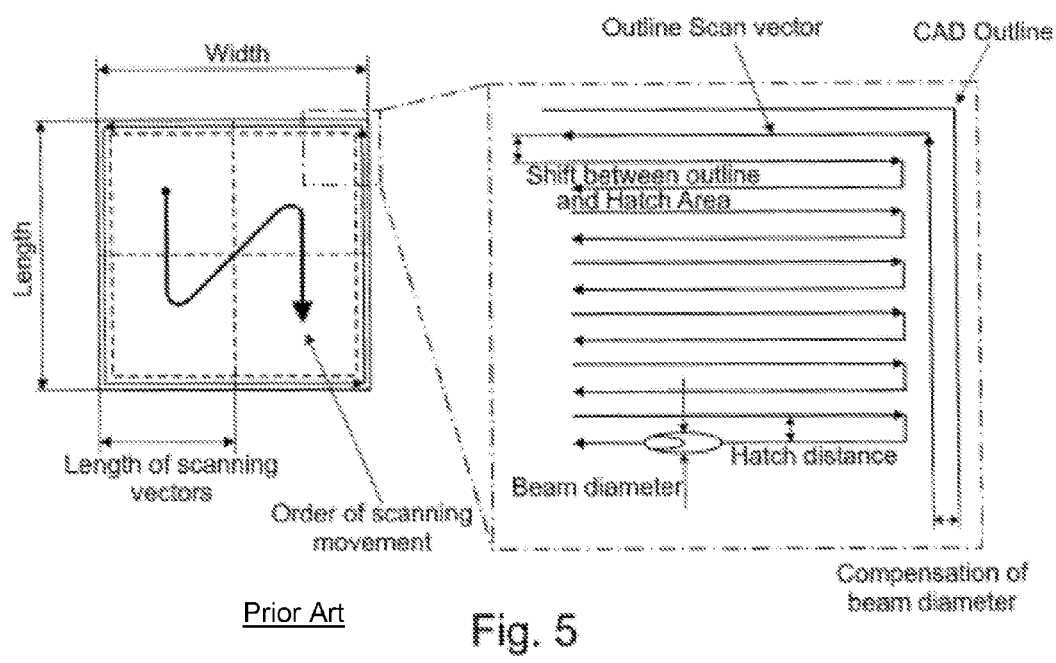
FIG. 5 shows a typical SLM track alignment known from the state of the art.

It is also possible to get rid of the preferred secondary orientation (achieve a non-pronounced secondary orientation) by using scan vectors, which are parallel within each island of each layer and rotated by for example an angle of 63° in each subsequent layer (see FIG. 4a, 4b) or use random angles (see FIG. 4c, 4d) to vary the scan direction within each island and each layer. As an example, a rotation of the scan pattern by 63° in subsequent layers could be implemented to obtain non-pronounced secondary orientation.

The preferred microstructures do not have to be implemented in the whole volume of the component. Instead, the alignment can be turned on and off in an arbitrary manner for different zones, depending on the local mechanical integrity (MI) requirements. This is an advantage compared to investment casting or E-LMF, where the control of the microstructure is lost, once epitaxial growth conditions are no longer present and equiaxed grain growth has occurred.

Preferably, the particle size distribution of the powder used in this SLM, SLS or EBM processes is adjusted to the layer thickness d to have to a good flowability, which is required for preparing powder layers with regular and uniform thickness d.

Preferably, the particles of the powder used in this process have a spherical shape. The exact particle size distribution of the powder may be obtained by sieving and/or winnowing (air separation). Furthermore, the powder may be obtained by gas or water atomization, plasma-rotating-electrode process, mechanical milling and like powder metallurgical processes.

In other cases, a suspension may be used instead of powder.

When said high temperature material is a Ni-based alloy, a plurality of commercially available alloys may be used like Waspaloy®, Hastelloy® X, IN617®, IN718®, IN625®, Mar-M247®, IN100®, IN738®, 1N792®, Mar-M200®, B1900®, RENE 80®, Alloy 713®, Haynes 230®, Haynes 282®, or other derivatives.

When said high temperature material is a Co-based alloy, a plurality of commercially available alloys may be used like FSX 414®, X-40®, X-45®, MAR-M 509® or MAR-M 302®.

When said high temperature material is a Fe-based alloy, a plurality of commercially available alloys may be used like A 286®, Alloy 800 H®, N 155®, S 590®, Alloy 802®, Incoloy MA 956®, Incoloy MA 957® or PM 2000®.

For example an AlNiFe-based alloy is also suitable.

Especially, these alloys may contain fine dispersed oxides such as $Y_2O_3$, $Al_2O_3$, $ThO_2$, $HfO_2$, $ZrO_2$.

In one preferred embodiment the hybrid component 11 manufactured with the method according to the invention is a blade or a vane for a turbo machine. The blade/vane comprises an airfoil with a profile. The alignment of the secondary grain orientation is matched with the airfoil profile and the alignment of the secondary grain orientation is gradually and continuously adapted to the shape of the airfoil. This will lead to very good mechanical and fatigue properties.

If the preform 2 has a single crystal (SX) microstructure the second part of the component 11—here the airfoil—can be generated with a secondary grain orientation of the added material, which is aligned with the main crystallographic orientation of the single crystal preform 2.

In a different embodiment the hybrid metallic component 11 comprises a preform 2, which has an isotropic microstructure with no preferred grain orientation and only the second part of the component 11 has a primary and secondary grain orientation.

If the hybrid metallic component 11 according to the invention has zones/parts with isotropic and anisotropic properties then there may be one or multiple transition zones between these parts.

The invention claimed is:

1. A method for manufacturing a hybrid component, comprising:
    manufacturing a preform as a first part of the hybrid component, then
    successively building up on that preform a second part of the component from a metallic powder material via an additive manufacturing process by scanning with an energy beam,
    establishing a controlled grain orientation in a primary direction and in a secondary direction of at least a part of the second part of the component via the successively building up of the second part of the component on the preform, wherein the controlling of the grain orientation in the secondary direction is performed via alternating parallel and orthogonal scanner paths of the energy beam in subsequent layers as the second part is successively built up on the preform, the parallel scanner paths being parallel to a direction of the component that is to have a smallest value of Young's Modulus and the orthogonal scanner paths are orthogonal to the direction of the component that is to have the smallest value of Young's Modulus; and wherein the controlled grain orientation in the secondary direction is aligned to a cross section profile of said component or to local load conditions for said component.

2. The method according to claim 1, wherein the alternating parallel and orthogonal scanner paths of the energy beam in subsequent layers as the second part is successively built up on the preform comprises a first scanner path of the energy beam that is parallel to the direction of the component that is to have the smallest value of Young's Modulus applied to a first layer as the second part of the component is built-up on the preform and a second scanner path of the energy beam that is orthogonal to the direction of the component that is to have the smallest value of Young's Modulus applied a second layer that is positioned on the first layer as the second part of the component is built-up on the preform.

3. The method according to claim 1, wherein the preform is manufactured by casting, forging, milling or sintering.

4. The method according to claim 3, comprising:
machining the preform by a combination of two or more of selective laser melting, electron beam melting, laser metal forming and wire EDM.

5. The method according to claim 1, wherein the preform is manufactured by generative processes comprising at least one of: selective laser melting, electron beam melting, laser metal forming, and wire EDM.

6. The method according to claim 1, wherein said metallic material is one of a high-temperature Ni-based alloy, Co-based alloy, Fe-based alloy or combinations thereof.

7. The method according to claim 6, wherein said metallic material contains finely dispersed oxides comprising one of $Y_2O_3$, $Al_2O_3$, $ThO_2$, $HfO_2$, $ZrO_2$.

8. The method according to claim 1, wherein said additive manufacturing process for the second part of the component is one of selective laser melting (SLM), selective laser sintering (SLS) or electron beam melting (EBM), the additive manufacturing process comprising:

a) manufacturing or at least pre-machining a preform;

b) generating a three-dimensional model of volumes to be added on the preform followed by a slicing process to calculate cross sections;

c) passing said calculated cross sections to a machine control unit of a machine;

d) providing a metallic powder material;

e) placing the preform in a work chamber such that an interface to a zone to be additively manufactured is parallel to a powder deposition plane of the machine;

f) determining exact positions and orientation of the preform;

g) preparing a powder layer with a regular and uniform thickness on the preform;

h) performing melting of the powder layer by scanning with an energy beam an area corresponding to a cross section of said component according to the three-dimensional model stored in the machine control unit, wherein the energy beam is scanned in a way that the orientation in the secondary direction matches with known main crystallographic directions of the preform and facilitates the establishing of the controlled grain orientation in the primary direction and in the secondary direction;

i) lowering an upper surface of a previously formed cross section by one layer thickness; and j) repeating steps from g) to i) until reaching a last cross section according to the three-dimensional model to perform the successively building up of the second part of the component on the preform.

9. The method according to claim 8, wherein in step a) an existing preform is cut and/or machined along a preferred plane and the following steps for build-up of the second part of the component are done on this pre-machined preform.

10. The method according to claim 8, wherein particle size distribution of said powder is adjusted to the layer thickness of said powder layer in order to establish a flowability -required for preparing powder layers with regular and uniform thickness.

11. The method according to claim 8, wherein the powder particles have a spherical shape and that an exact particle size distribution of the powder is obtained by sieving and/or winnowing and/or air separation.

12. The method according to claim 8, wherein said powder is provided by one of: gas atomization, water atomization, a plasma-rotating-electrode process, and mechanical milling.

13. The method according to claim 8, wherein said additive manufacturing process uses a suspension.

* * * * *